United States Patent [19]

Sawase et al.

[11] Patent Number: 5,414,533
[45] Date of Patent: May 9, 1995

[54] PORTABLE FACSIMILE TRANSMITTER WITH AUTOMATIC POWER SWITCH RESPONSIVE TO MANUAL OPERATION

[75] Inventors: Kensuke Sawase; Osamu Kihara, both of Kyoto, Japan

[73] Assignee: Rohm Co. Ltd., Kyoto, Japan

[21] Appl. No.: 979,611

[22] Filed: Nov. 19, 1992

[30] Foreign Application Priority Data

Nov. 20, 1991 [JP] Japan .................... 3-304758

[51] Int. Cl.6 ........................... H04N 1/107
[52] U.S. Cl. ........................ 358/473; 382/313
[58] Field of Search ............. 358/473, 474, 494, 497; 382/59

[56] References Cited

U.S. PATENT DOCUMENTS 3,328,523  6/1967  Treseder et al. .................. 382/5
3,936,596  2/1976  Inuiya .............................. 382/59
4,887,165 12/1989  Sato et al. ...................... 358/474
5,003,193  3/1991  Yatsuzuka ....................... 358/473

Primary Examiner—Scott A. Rogers
Attorney, Agent, or Firm—Brumbaugh, Graves, Donohue & Raymond

[57] ABSTRACT

A pair of rollers spaced at a predetermined interval are arranged in the bottom part of a facsimile machine. When the facsimile machine is manually moved on an original document while pushed against it, the rollers rotate. Detecting the rotation of the rollers, an encoder performs power on/off operations, i.e., enables/disables the supply of an electric power from a compact power supply unit, in accordance with the start/stop of the roller rotation. Upon the power on, an image sensor starts to read the document. An image signal produced by the image sensor is processed by a signal control unit, and then modulated by a G3 modem. The modulated signal is sent out to a telephone line via a network control board.

5 Claims, 3 Drawing Sheets

PORTABLE FACSIMILE TRANSMITTER WITH AUTOMATIC POWER SWITCH RESPONSIVE TO MANUAL OPERATION

BACKGROUND OF THE INVENTION

The present invention relates to an image transmitter most suitable for a portable facsimile machine which reads an original document etc. and transmits resultant image information.

Facsimile is one of means for transferring visible information between distant locations. A facsimile machine has an image sensor for reading an original document and a printer, and usually includes a telephone. When a user sends, by his facsimile machine, information on an original document to a distant destination (i.e., to a facsimile machine installed there), he first inputs a telephone number of the destination to his facsimile machine to establish a communicating state with the destination. Then, his facsimile machine reads the original document and transmits resultant image information to the destination. In general cases, the facsimile machine at the destination prints out received image information with a built-in printer.

However, since the facsimile machines of the above type have the printing function in addition to the document-reading function and transmitting/receiving function, a large-capacity power supply is required. Therefore, usually a commercial power line (e.g., AC 100 V) is used as the power supply. Since spaces for accommodating printing sheets such as heat-sensing sheets and for accommodating output sheets are needed, the facsimile machines are large and heavy. Therefore, the conventional facsimile machines are usually of a stationary type.

On the other hand, with the recent trend of downsizing equipment, which is remarkable in portable telephones, handy copying machines, etc., the facsimile machines are also required to be downsized to become portable. If a portable facsimile machine is realized, it is no longer necessary to consider an installation place etc., and facsimile machines will be used more widely to provide much convenience. However, for the reasons described above, it is difficult to downsize the facsimile machine to a portable one. No portable facsimile machines have been realized to date.

SUMMARY OF THE INVENTION

An object of the present invention is to provide an image transmitter that is portable, compact, light and of low power consumption.

According to the invention, an image transmitter comprises:

a pair of rollers arranged at a predetermined interval that rotate while an original document is scanned by the image transmitter;

an image sensor for reading the original document to produce an image signal;

power supply means;

switch means for enabling and disabling an electric power to be supplied from the power supply means to the image sensor in accordance with rotation of the pair of rollers;

signal control means for processing the image signal; and modulating means for modulating the processed image signal into a transmitting signal to be sent out to a telephone line.

The image transmitter transmits the image signal produced by the image sensor to a destination facsimile machine through telephone lines, but does not have a function of receiving image information from another facsimile machine. That is, the image transmitter is dedicated to the transmitting. Further, it neither has a function of printing image information nor is equipped with a motor that is employed in usual stationary facsimile machines. As a result, a space for accommodating printing sheets and that for a printing mechanism are not required. Therefore, compact and lightweight image transmitters can be realized. Further, the power supply capacity and the power consumption can be reduced.

In the image transmitter of the invention, an original document is read by manually moving the image transmitter on the document. That is, the rollers rotate when the image transmitter is moved while being pushed against the document weakly. In response to the rotation of the rollers, the switch means makes the power on. Upon the power-on, the image sensor starts to read the document. When the movement of the image transmitter is stopped, the rollers are stopped, the power is made off by the switch means, and the image sensor stops reading the document.

The switch means is constituted in a variety of ways. For example, the switch means may be an encoder that detects the rotation of the rollers and performs power on/off operations. If the encoder is attached to one of the rollers, it rotates together with the roller, detects the rotation of the encoder itself, and makes the power on. When the roller is stopped, the encoder makes the power off.

In another example, the switch means is constituted of a leaf spring engaged with a shaft that supports one of the rollers, and a micro switch that performs power on/off operations in accordance with expansion and contraction of the leaf spring. In this case, when the image transmitter is pushed against the document at a proper pressure, the support shaft of the roller is displaced upward together with the roller. In response, the leaf spring first contracts, and then expand upward by its restoring force to turn on the micro switch. When the pushing of the image transmitted is stopped, or it is detached from the document, the support shaft and the rollers return to their original positions and the micro switch is turned off by the restoring force of the leaf spring. In this example, since the image sensor does not start to read the document unless the image transmitter is pushed by a force stronger than a predetermined force, the distance between the document and the image sensor can be kept constant. Therefore, the scanning can be performed stably to provide a clear image.

DESCRIPTION OF THE PREFERRED EMBODIMENTS

An image transmitter of the present invention is described hereinafter by way of embodiments.

Figure 1:
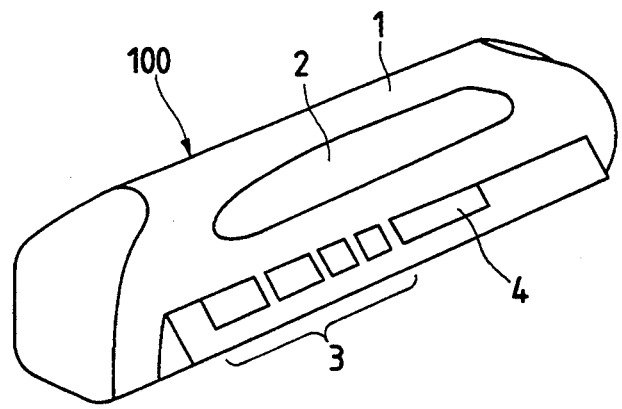
FIG. 1 is a perspective view showing an appearance of a facsimile machine according to an embodiment of the invention.

FIG. 1 is a perspective view showing an appearance of a portable facsimile machine as an embodiment of the image transmitter. A facsimile machine 100 has a body case 1 with a shape as shown in FIG. 1. A pair of recess-like gripping portions 2 are provided on the top of the body case 1. Further, various switches (a start switch, stop switch, function switch, mode switch, etc.) 3 and a display 4 for enabling an user to recognize an operation state etc. are provided on the front face of the body case 1.

Figure 2:
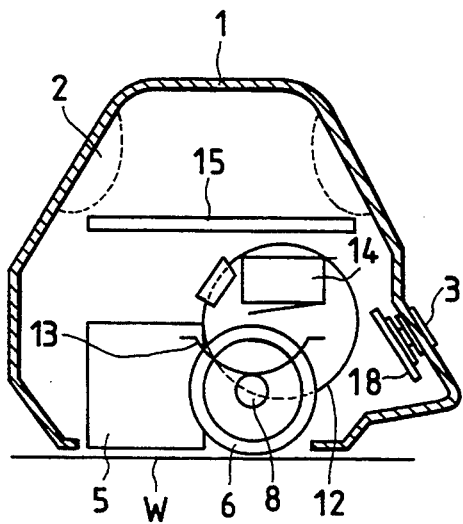
FIG. 2 is a transverse sectional view of the facsimile machine of FIG. 1.
Figure 3:
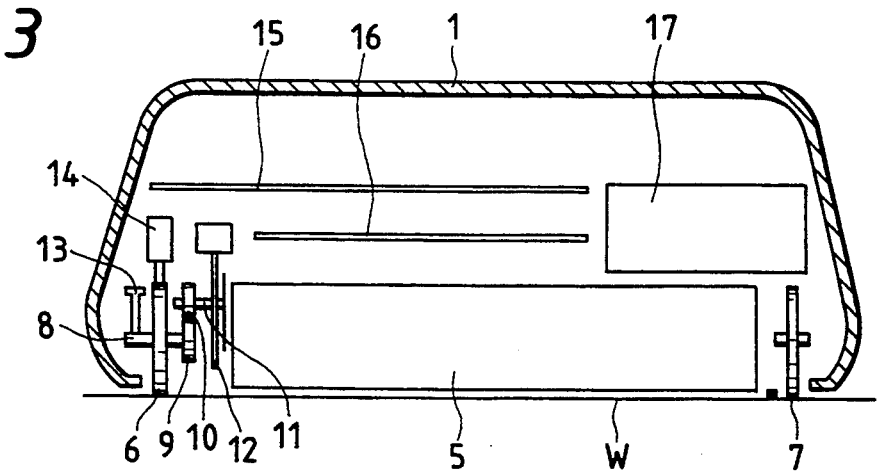
FIG. 3 is a longitudinal sectional view of the facsimile machine of FIG. 1.

FIG. 2 is a transverse sectional view and FIG. 3 is a longitudinal sectional view of the facsimile machine 100. The bottom of the body case 1 is opened along the longitudinal direction, and a document-reading contact-type image sensor 5 is provided at the rear-bottom portion so as to be exposed from this opening. On both sides of the image sensor 5 in the bottom portion, a pair of rollers 6, 7 are rotatably supported so as to be somewhat protruded from the opening. A gear 9 is fixed to one end of a support shaft 8 for supporting the roller 6. Another gear 10 is engaged with the gear 9. An encoder 12 is attached to a shaft 11 that rotates together with the gear 10.

A U-shaped leaf spring 13 is engaged with the other end of the support shaft 8 to constantly urge it downward. A micro switch 14 is placed right over the roller 6 with a very small gap therebetween. In the upper portion of the inside of the body case 1, a CPU board 15 on which various electronic components including a CPU, other circuit boards 16, and a compact power supply unit 17 are provided. The switches 3 are mounted on a control board 18 that is provided along the internal surface of the body case 1. Proper electrical connections are made between the image sensor 5, encoder 12, micro switch 14, boards 15, 16, 18 and the compact power supply unit 17 (not shown).

Figure 4:
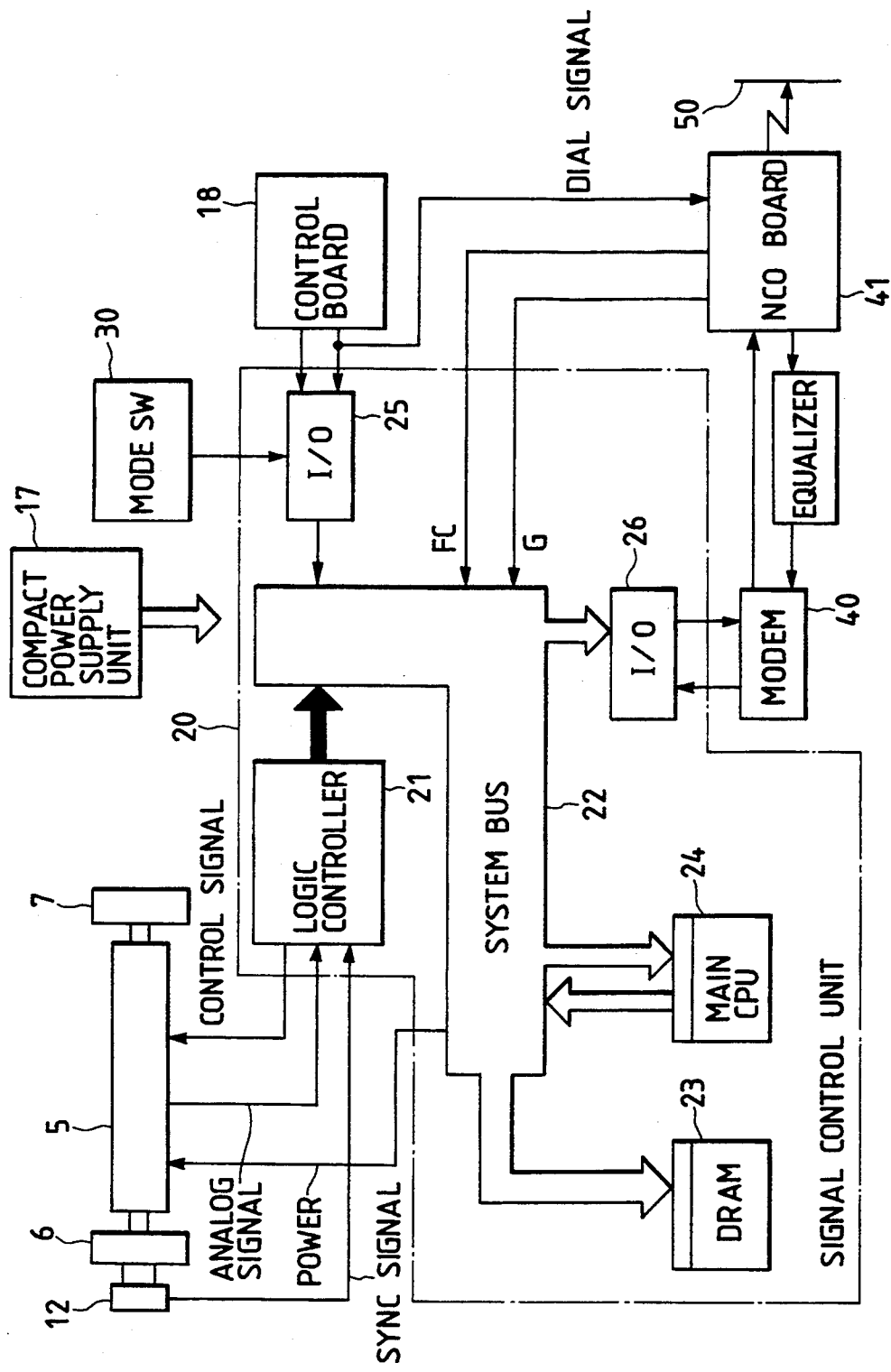
FIG. 4 is a block diagram showing an electrical configuration of the facsimile machine of FIG. 1.

Referring to FIG. 4, an electrical configuration of the above facsimile machine 100 is described. The image sensor 5 consists of LEDs (not shown) as a light source and an image pickup device (not shown), such as a CCD, having photoelectric conversion elements. Light reflected by an original document W (see FIGS. 2 and 3) is detected by the image pickup device of the image sensor 5, and is converted to a serial electric signal (analog signal) that is a luminance signal produced by prescribed pixels. The serial electric signal is provided to a signal control unit 20, where it is converted to data to be transmitted.

The signal control unit 20 has a logic controller 21, a system bus 22, a DRAM 23, a main CPU 24, an input signal I/O 25 and a signal transmitting I/O 26. While receiving a sync signal from the encoder 12 detecting the rotation of the roller 6, the logic controller 21 provides a control signal to the image sensor 5 in accordance with an instruction that is sent from the main CPU 24 via the system bus 22. Based on the sync signal, the logic controller 21 controls the image sensor 5 by the control signal so that an image signal is output from the image sensor at predetermined timing. The analog image signal thus produced is converted to a digital signal by an A/D converter (not shown), and sent, via the system bus 22, to the main CPU 24, which stores the received image signal into the DRAM 23.

The control board 18 and the mode switch 30 are connected to the system bus 22 via the input signal I/O 25. The control board 18 is provided along the internal surface of the front wall of the body case 1 as shown in FIG. 2, and the mode switch 30 is one of the switches 3. In response to manipulation of the switches 3, the main CPU 24 recognizes various instructions such as those for start and stop of image reading, and controls the operation of the logic controller 21 etc. The mode switch 30 is used to determine whether a dial signal should be a dial pulse signal or a DTMF signal, and to change over the pulse rate of a clock signal.

A G3 modem 40 is connected to the system bus 22 via the signal transmitting I/O 26, and serves to subject the image signal sent via the system bus 22 to predetermined modulation to convert it to a signal that can be transmitted through telephone lines. The signal transmitting I/O 26 converts the digital signal sent via the system bus 22 to an analog signal, and provides it to the G3 modem 40.

The image signal from the G3 modem 40 is then sent out to a telephone line 50 via a network control board 41. The dial signal sent from the control board 18 is directly provided to the network control board 41, which, based on the dial signal, outputs the DTMF signal or dial pulse signal.

The compact power supply 17 is constituted of a battery or converter (both not shown), and provides necessary voltages to the respective parts. While in this embodiment the image signal is sent out to the telephone line 50 via the network control board 41, it may be transmitted by wireless to a parent telephone that is connected to the telephone line 50.

To transmit an image with the facsimile machine 100 thus constituted, a user first turns on the start switch of the switches 3, specifies a destination, and then makes an instruction to start a transmission. In response to this transmission instruction, the network control board 41 is rendered in an off-hook state, and provides the dial signal to the telephone line 50. When a facsimile machine at the destination is rendered in an off-hook state to establish a closed loop, the network control board 41 informs the main CPU 24 of this state. The main CPU 24 performs preprocessing for facsimile transmission, such as handshaking, with the destination facsimile machine.

When the preparation for transmission is completed, the user weakly pushes the facsimile machine 100 against the proper portion of the original document W while gripping the gripping portions 2 of the body case 1, and moves the facsimile machine 100 forward while maintaining the relationship with the document W (see FIGS. 2 and 3). When the facsimile machine 100 moves, the rollers 6, 7 rotate and the rotation of the roller 6 is transmitted to the encoder 12 via the support shaft 8, gears 9, 10 and shaft 11. Thus, the encoder 12 is rotated, by which a voltage is supplied from the power supply unit 17 to a driver IC of the image sensor 5 via the system bus 22. At the same time, the micro switch 14 is turned on, by which a voltage is supplied from the power supply unit 17 to the LEDs of the image sensor 5. In response, the image sensor 5 starts to read the document W.

The image signal from the image sensor 5 is converted to the digital signal, and provided to the main CPU 24 via the system bus 22. The main computer 24 stores the digital image data into the DRAM 23 in a predetermined order. Then, the main CPU 24 reads the image data from the DRAM 23, and the image data is provided to the telephone line 50 via the transmitting I/O 26, G3 modem 40 and network control board 41, so that the modulated image signal is sent out to the destination.

Figure 5:
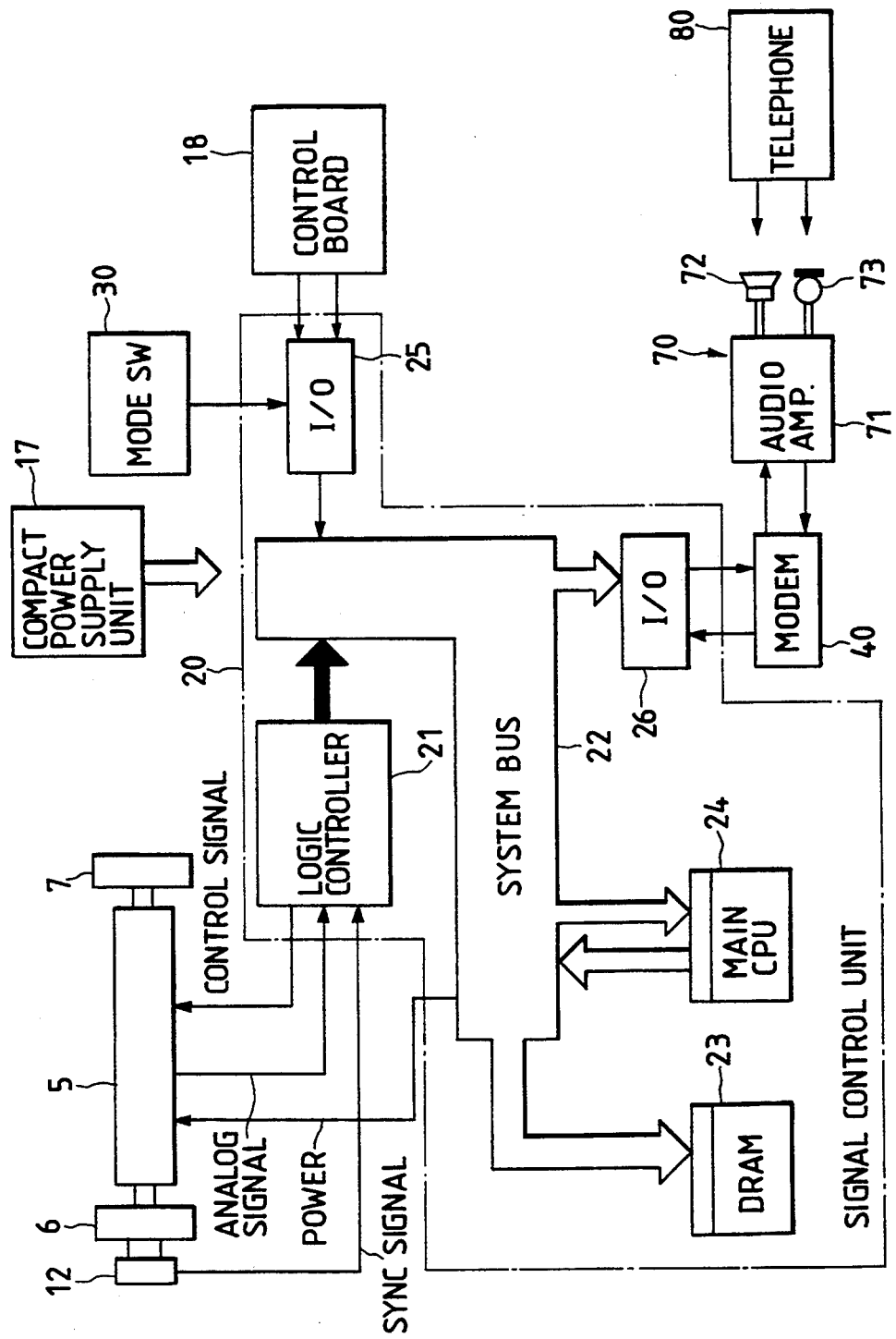
FIG. 5 is a block diagram showing an electrical configuration of a facsimile machine according to a second embodiment of the invention.

FIG. 5 is a block diagram showing a configuration of a facsimile machine according to another embodiment, which has the same fundamental configuration as the first embodiment. That is, the image sensor 5 for reading the original document W, rollers 6, 7, encoder 12, compact power supply unit 17, control board 18, signal control unit 20, mode switch 30, etc. of the second embodiment are the same as the first embodiment.

In the second embodiment, an acoustic coupler 70 is connected to the G3 modem 40, and is constituted of an audio amplifier 71, a speaker 72 and a microphone 73. Therefore, the transmission signal output from the G3 modem 40 can be monitored by outputting it from the speaker 72. By connecting the speaker 72 and the microphone 73 to a handset of a telephone 80, the image signal can be transmitted through telephone lines.

When a user actually sends an image with the above facsimile machine, he first calls a destination using the telephone 80. After the telephone line connection to the destination has been established, the user manipulates the switches 3 and moves the facsimile machine on the document W, as in the case of the first embodiment. The image signal produced by the image sensor 5 is finally converted to an audio signal, which is transmitted to the destination via the telephone 80.

In the second embodiment, since the facsimile machine itself does not have a function of a telephone, on-hooking, off-hooking, sending of the dial signal to the telephone line, and other operations are performed by the telephone 80. Therefore, a ten-key pad etc. for dialing may be omitted from the switches 3 provided on the control board 18.

In the above description, the image signal is transmitted to a destination in the form of a dial pulse signal or DTMF signal using the network control board 41 (first embodiment), or in the form of an audio signal using the acoustic coupler 70 (second embodiment). It is noted that the transmission method is not limited to those methods. For example, an input terminal may be provided in a telephone or the like, and the G3 40 modem may be directly connected to the telephone or the like using that terminal. The G3 modem may be connected to the telephone or the like using the terminal after a telephone line connection has been established by it.

As described above, the image transmitter of the invention can only be used for transmission of image information, i.e., does not have the printing function. Further, the power on/off is effected by a switch means that works in link with the rollers. Therefore, a space for a printing mechanism and that for accommodating printing sheets are not required. Since no motor is used, the power supply capacity can be reduced. Thus, there can be realized image transmitters which are compact, light and of low power consumption.

Therefore, the image transmitter of the invention is most suitable for a portable facsimile machine. In particular, it becomes possible for a salesman, pressman, etc. to conveniently send document information from any outside location where a telephone or telephone line is installed.

What is claimed is:

1. An image transmitter comprising:
    a pair of rollers for rotating while an original document is scanned by the image transmitter;
    an image sensor for reading the original document to produce an image signal;
    power supply means;
    switch means for enabling and disabling electric power to be supplied from the power supply means to the image sensor in response to detection of motion of at least one of the pair of rollers upon initiation of a document scanning motion of the transmitter;
    signal control means for processing the image signal; and
    modulating means for modulating the processed image signal into a transmitting signal to be sent out to a telephone line.

2. The image transmitter of claim 1, wherein the switch means further comprises an encoder for detecting the rotation of at least one of the pair of rollers and enabling and disabling the supply of electric power to an image sensor driver.

3. The image transmitter of claim 1, wherein the switch means comprises a spring member engaged with a shaft of at least one of the pair of rollers, and a micro switch for enabling and disabling the supply of electric power in accordance with expansion and contraction of the spring member.

4. The image transmitter of claim 1, wherein the original document is scanned by the image transmitter manually.

5. The image transmitter of claim 1, further comprising means for sending out the transmitting signal to a telephone line.

* * * * *